Nov. 26, 1940. Z. NICOLAS 2,223,266
SAW SET
Filed Sept. 7, 1939
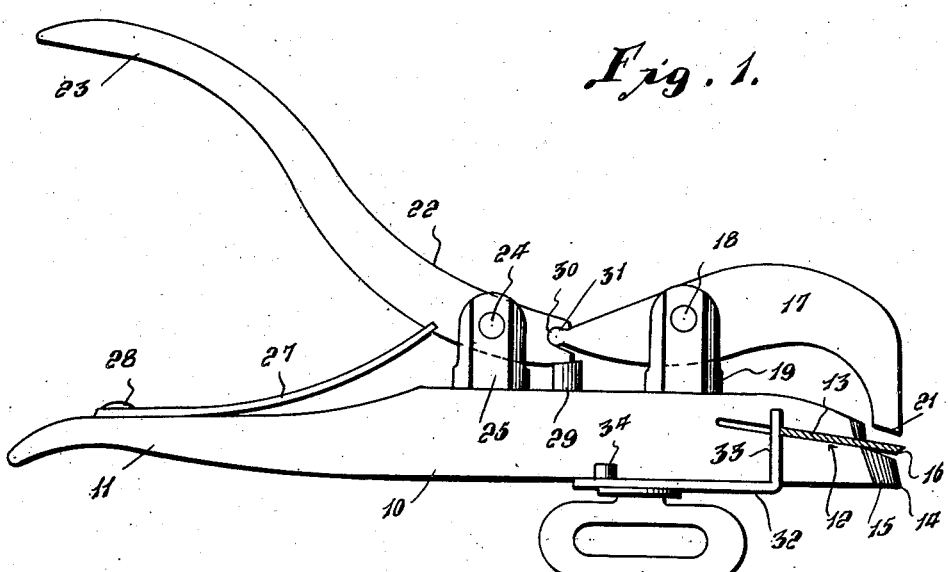
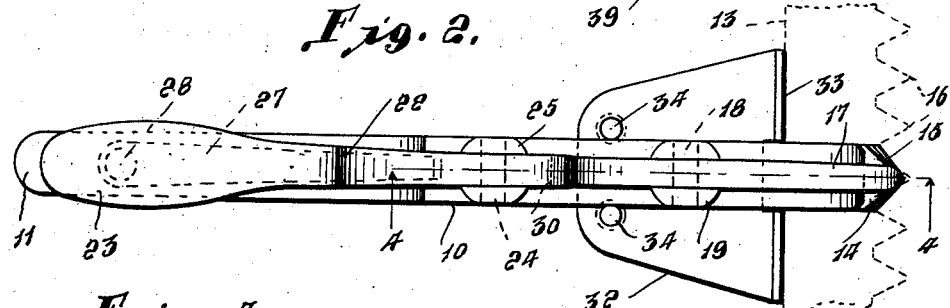
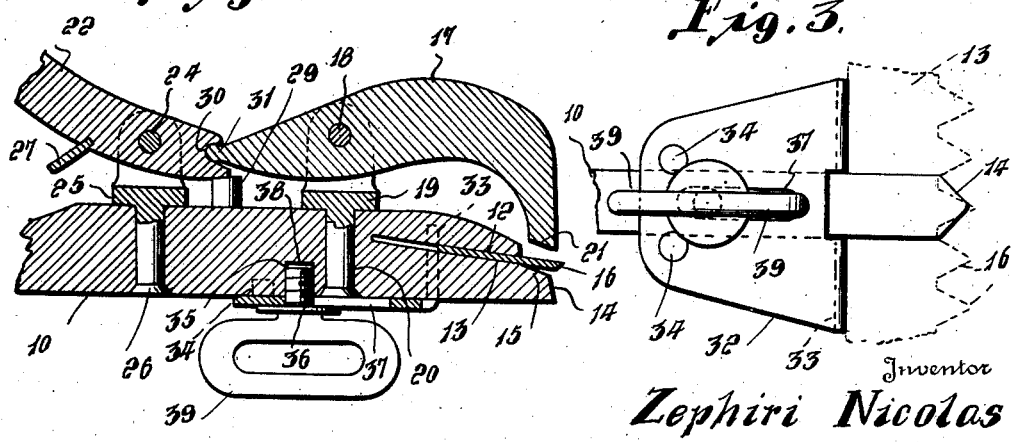
Inventor
Zephiri Nicolas
By L. F. Randolph
Attorney Patented Nov. 26, 1940

2,223,266

UNITED STATES PATENT OFFICE 2,223,266

SAW SET

Zephiri Nicolas, Eustis, Maine

Application September 7, 1939, Serial No. 293,810

1 Claim. (Cl. 76—64)

This invention relates to a saw set and is preferably of the portable type carried by and operable by one hand.

It is particularly aimed to provide a novel construction whereby the saw blade, for instance a buck saw blade, may have the teeth thereof set from the back of the saw, a construction wherein adjustment may be made to accommodate blades of different widths, a construction insuring the setting of the teeth in a true manner without twisting, and a construction which may be effectively used to set a tooth after filing without dulling the same, and a construction wherein the set will remain for a maximum period.

Various additional objects and advantages will become apparent from a consideration of the description following taken in connection with the accompanying drawing illustrating an operative embodiment.

In said drawing:

Figure 1 is a view in side elevation showing the improved saw set, with a saw blade in place therein, the latter being in section;

Figure 2 is a plan view of the parts of Figure 1;

Figure 3 is a bottom or inverted plan view of the forward portion of the parts of Figures 1 and 2, and Figure 4 is a fragmentary longitudinal sectional view taken on the plane of line 4—4 of Figure 2.

Referring specifically to the drawing wherein like reference characters designate like or similar parts, 10 designates a bar or stock having a handle or grip 11 at one end and at the other end having a slot or kerf 12, disposed preferably at an angle as shown so as to removably engage a buck saw blade or any equivalent article, 13, from the rear. The upper portion of bar 10 above slot 12 terminates short of the forward end of the lower portion of such bar in order to provide an anvil projection 14, preferably shaped similarly to a saw tooth as shown, and the upper surface of which is preferably at a slightly more acute angle as at 15 in order that the teeth of the saw 16 may be set against the same, with uniformity of the setting of all teeth assured.

A setting head 17 is employed in the form of a lever pivoted at 18 to a post 19 suitably riveted or otherwise rigidly secured as at 20 to the bar 10. The tooth engaging extremity of the head 17 is preferably disposed at the same angle as the surface 15, at 21.

Head 17 is operable to set the saw teeth through the depression of a lever 22 at its handle or grip end 23. Such lever is pivoted at 24 to a post 25 suitably secured as by riveting at 26 to the bar 10. A blade spring 27 fastened at 28 to bar 10 engages the lever 22 and urges its forward end into engagement with a rest or lug 29. The forward end of such lever 22 has a notch 30 into which the rear extremity 31 of head 17 extends, such extremity preferably being surrounded as shown.

A guard plate 32 co-acts with the saw blade 12 to insure accurate positioning thereof, and to accommodate blades of different sizes, and permit setting of the teeth of the blades to any extent preferred. This plate in vertical section is preferably of L-shape as shown since it has vertical lugs 33 disposed on opposite sides of the bar 10. Such plate 32 also has vertical guide lugs 34 disposed on opposite sides of bar 10. As a result, the guard 32 may be moved forwardly and rearwardly according to the saw to be accommodated and the setting of the teeth. This plate 32 is secured in place rigidly by means of a screw 35 having a screw threaded shank 36 passing through an elongated slot 37 in the plate and engaging the screw threads in a socket 38 in the bar. Screw 35 preferably has a relatively large head or wing 39 to facilitate finger manipulation thereof.

It will be clear that with the plate 32 properly adjusted, and a saw blade 13 engaged in the kerf or slot 12, and the desired teeth of the saw centered with respect to the anvil 14 and head 17, that depression of the lever 22 at grip 23, toward the grip 11, results in depressing the head 17 at the surface 21, to thereby deflect or depress the positioned saw tooth in order to set it.

Various changes may be resorted to provided they fall within the spirit and scope of the invention.

I claim as my invention:

A saw set of the class described having a bar, said bar having an inclined slot extending inwardly from one end thereof providing an anvil on one side of the slot to position a saw blade for setting of a tooth thereof, said bar being cutaway at the free end of the portion opposed to said anvil, the surface of the anvil opposite to the cutaway portion being at an angle to the slot, a head pivotally mounted on the bar movable in the cutaway portion and operable to set the saw tooth against the surface of the anvil opposite the cutaway portion, a grip lever pivoted to the bar and interconnected with the head, a lug rising from the bar between the pivots of the head and grip lever and on which the grip lever normally rests, spring means on the bar contacting the grip lever on the side thereof opposite to said lug and urging the head to open position, and a plate adjustable along the undersurface of the anvil, said plate being generally of L-shape and having a slot providing portions perpendicular to the plate and crossing the slot at opposite sides thereof, and positioning lugs rising from the plate in the rear of said part and on opposite sides of the bar.

ZEPHIRI NICOLAS.